(12) United States Patent
Fedorovich

(10) Patent No.: US 6,386,546 B1
(45) Date of Patent: May 14, 2002

(54) SEAL CARTRIDGE

(75) Inventor: George Fedorovich, Nacogdoches, TX (US)

(73) Assignee: JM Clipper Corporation, Nacogdoches, TX (US)

( * ) Notice: Subject to any disclaimer, the term of this patent is extended or adjusted under 35 U.S.C. 154(b) by 71 days.

(21) Appl. No.: 09/643,944

(22) Filed: Aug. 23, 2000

Related U.S. Application Data

(63) Continuation-in-part of application No. 09/503,211, filed on Feb. 14, 2000, now abandoned, which is a continuation of application No. 09/186,699, filed on Nov. 6, 1998, now Pat. No. 6,024,362, which is a continuation-in-part of application No. 08/931,493, filed on Sep. 16, 1997, now Pat. No. 5,967,524, which is a continuation-in-part of application No. 08/923,559, filed on Sep. 4, 1997, now Pat. No. 6,065,755, which is a continuation-in-part of application No. 08/725,958, filed on Oct. 7, 1996, now Pat. No. 5,735,530, which is a continuation of application No. 08/251,268, filed on May 31, 1994, now abandoned, which is a continuation-in-part of application No. 08/064,375, filed on May 21, 1993, now Pat. No. 5,316,317.

(51) Int. Cl.⁷ ............................ F16J 15/32; F16J 15/447
(52) U.S. Cl. ........................................ 277/351; 277/421
(58) Field of Search ................................ 277/347, 350, 277/351, 412, 418, 419, 420, 421

(56) References Cited

U.S. PATENT DOCUMENTS

| | | |
|---|---|---|
| 2,571,352 A | 10/1951 | Fast |
| 2,643,141 A | 6/1953 | Bryant |
| 3,128,104 A | 4/1964 | Teske |
| 3,477,385 A | 11/1969 | Tangeman et al. |
| 4,304,409 A | 12/1981 | Orlowski |
| 4,458,957 A | 7/1984 | Greener |
| 4,498,006 A | 2/1985 | Orlowski |
| 4,576,383 A | 3/1986 | Ballard |
| 4,596,394 A | 6/1986 | Schmitt |
| 4,743,034 A | 5/1988 | Kakabaker et al. |
| 4,763,904 A | 8/1988 | Martinie |
| 4,848,937 A | 7/1989 | Hartman et al. |
| 4,890,941 A | 1/1990 | Calafell, II et al. |
| 4,981,303 A | 1/1991 | Matsushima et al. |
| 5,244,216 A | 9/1993 | Rhode |
| 5,259,628 A | 11/1993 | Nisley |
| 5,290,047 A | 3/1994 | Duffee et al. |
| 5,522,601 A | 6/1996 | Murphy |
| 5,639,095 A | 6/1997 | Rhode |
| 5,908,195 A | 6/1999 | Sharrer |
| 5,951,020 A | 9/1999 | Orlowski |
| 6,024,362 A | 2/2000 | Fedorovich |
| 6,062,568 A | 5/2000 | Orlowski et al. |
| 6,234,489 B1 * | 5/2001 | Orlowski et al. |
| 6,241,252 B1 * | 6/2001 | Jump et al. |

* cited by examiner

Primary Examiner—Anthony Knight
Assistant Examiner—John L. Beres
(74) Attorney, Agent, or Firm—Dickstein Shapiro Morin & Oshinsky LLP

(57) ABSTRACT

A seal cartridge adapted to be mounted upon a rotating shaft, including a rotor and a stator, the rotor and stator being arranged to create a labyrinth portion and a contact portion. The rotor includes a radially outwardly directed surface and the stator includes one or more flanges biased toward the rotor surface to create the contact portion. The rotor and stator create a labyrinth portion with an inwardly facing ridge positioned within an outwardly facing groove. The stator may include a shoulder for positioning the seal cartridge with respect to a housing, or instead a sloped surface. The rotor may also have a flange which deforms and fits within an annular notch of the stator.

44 Claims, 7 Drawing Sheets

SEAL CARTRIDGE

This is a continuation-in-part of application Ser. No. 09/503,211, filed Feb. 14, 2000, now abandoned, which is a continuation of application Ser. No. 09/186,699, filed Nov. 6, 1998, now U.S. Pat. No. 6,024,362, which is a continuation-in-part of application Ser. No. 08/931,493, filed Sep. 16, 1997, now U.S. Pat. No. 5,967,524, and a continuation-in-part of application Ser. No. 08/923,559, filed Sep. 4, 1997, now U.S. Pat. No. 6,065,755, which is a continuation-in-part of application Ser. No. 08/725,958, filed Oct. 7, 1996, now U.S. Pat. No. 5,735,530, which is a continuation of application Ser. No. 08/251,268, filed May 31, 1994, now abandoned, which is a continuation-in-part of application Ser. No. 08/064,375, filed May 21, 1993, now U.S. Pat. No. 5,316,317.

FIELD OF THE INVENTION

The present invention relates to a device for providing a static and a dynamic seal between a rotatable shaft and a housing. In particular, the present invention relates to a seal cartridge which includes a labyrinth portion and a contact portion, while providing protection to the rotating shaft from contact by the contact portion.

BACKGROUND OF THE INVENTION

Prior art devices for sealing a rotating shaft are disclosed in U.S. Pat. No. 4,022,479 (Orlowski). Seal devices of this type may be used to inhibit oil from escaping out of a bearing housing and/or to inhibit contaminants from working their way into the housing. The prior art devices are formed of at least two ring-shaped members that rotate with respect to each other when the shaft is rotated. One of the members is fixed to the housing and does not rotate. The other member rotates with the rotating shaft.

The two ring members should be located very close together, particularly when the seal device is used to isolate the bearing from small particulate contaminants. Even small quantities of such contaminants are capable of significantly deteriorating the bearing. To prevent such contamination, the two relatively rotatable ring members must be held together very closely, with only a very narrow space therebetween.

The ring members of the Orlowski seal device are connected together by a separate securing means, not shown in the prior art patent. The ring members themselves have no means for establishing and maintaining a narrow spacing therebetween. Therefore, the prior art seal device cannot be manufactured as a unit with a preset, fixed spacing. The spacing between the ring members has to be set when the seal device is installed into the housing. This leaves room for human error outside the control of the device manufacturer. In particular, the Orlowski device can be improperly installed, with the ring members located too far apart to perform satisfactorily. Another problem with the Orlowski device is that the ring members may be separated subsequent to installation, for example by high pressure cleaning spray.

Prior art devices showing labyrinth and/or contact seals are disclosed in U.S. Pat. Nos. 5,259,628 (Nisley), 5,028,054 (Peach), and 4,379,600 (Muller). The device referred to in Muller is a dust seal between an inner race and an outer race. The dust seal is accomplished either through a labyrinth arrangement of L-shaped rings or through a contact seal. The device of Muller provides no mechanism for sealing, either dynamically or statically, fluid from exiting the device.

The device disclosed by Nisley is a seal assembly with a rotor, a housing, a V-ring and a metal ring. The housing and the rotor have alternating teeth and grooves which intermesh to form a labyrinth seal. The metal ring fits within an angular groove in the housing. The V-ring is positioned on the rotor and makes contact with the metal ring on the air side of the device. The device as disclosed by Nisley is, thus, formed of four separate machined pieces, and is relatively expensive to manufacture. Such a seal device, since it has four separate parts which must be fit together, will have correspondingly greater leakage points than a seal device with fewer parts. Further, the V-ring is positioned to make contact with a metal ring, which may wear the V-ring, leading to an opening between the housing and the rotor through which contaminants and fluid may travel.

The device referred to in Peach has, like Nisley, numerous separately machined or formed parts, thus increasing the device's complexity and possibility of leakage.

U.S. Pat. No. 5,522,601 (Murphy) refers to a locking labyrinth sealing assembly where a flange on a rotor wraps around and interlocks with a flange on a stator. The Murphy device, however, fails to disclose or suggest a contact portion on the oil side and a wholly non-contact portion of the seal on the air side, nor does it show the stator contacting the rotor on the oil side. Furthermore, the Murphy device does not include a cartridge device acting as a rotor.

U.S. Pat. Nos. 4,981,303 (Matsushima et al.) and 4,596,394 (Schmitt) refer to sealing devices having contact portions on both the oil side and the air side.

SUMMARY OF THE INVENTION

The disadvantages of the prior art are alleviated to a great extent by the present invention which provides a seal cartridge including an interlocked two-piece non-contact labyrinth seal portion, with a rotor and stator, as well as a contact lip seal portion.

In a preferred embodiment, the invention provides a two-piece, interlocked seal device adapted to be mounted upon a rotatable shaft. The seal device includes a rotor with a flange, a radially outwardly directed groove, and a radially outwardly directed surface, and a stator with a cover having an annular notch and a radial opening adapted to direct contaminants from the seal, a radially inwardly directed ridge, and at least one flange biased toward the rotor surface. The stator ridge is positioned within the rotor groove and the rotor flange is positioned within the stator annular notch to create a labyrinth portion and the stator flange and the rotor surface create a contact portion.

In one aspect of the invention, the two-piece, interlocked seal device includes a stator having a cover with an annular notch and a radial opening adapted to direct contaminants from the seal, a radially inwardly directed ridge including an inclined surface, and a plurality of flanges biased toward the rotor surface.

The invention further provides a sealed system including a housing, a rotatable shaft and a two-piece seal device. The seal device includes a rotor having a flange, a radially outwardly directed groove, and a radially outwardly directed surface, and a stator having a cover with an annular notch and a radial opening adapted to direct contaminants from the seal, a radially inwardly directed ridge, and at least one flange biased toward the rotor surface. The stator ridge is positioned within the rotor groove and the rotor flange is positioned within the stator annular notch to create a labyrinth portion and the stator flange and the rotor surface create a contact portion.

An object of the invention is to provide an interlocked two-piece seal having a labyrinth seal portion and a separate, contact portion for both static and dynamic sealing. Forming the seal of only two pieces is advantageous. A two-piece seal may have fewer leakage paths than a seal having a greater number of pieces. Moreover, a two-piece seal may be more economical to manufacture and more reliable.

Another object of the invention is to provide a contact portion which provides a static seal during flooded conditions.

Another object of the invention is to provide a seal device that can be easily installed on a shaft without the need to repair or specially finish a worn or damaged shaft.

DETAILED DESCRIPTION OF PREFERRED EMBODIMENTS

Figure 1:
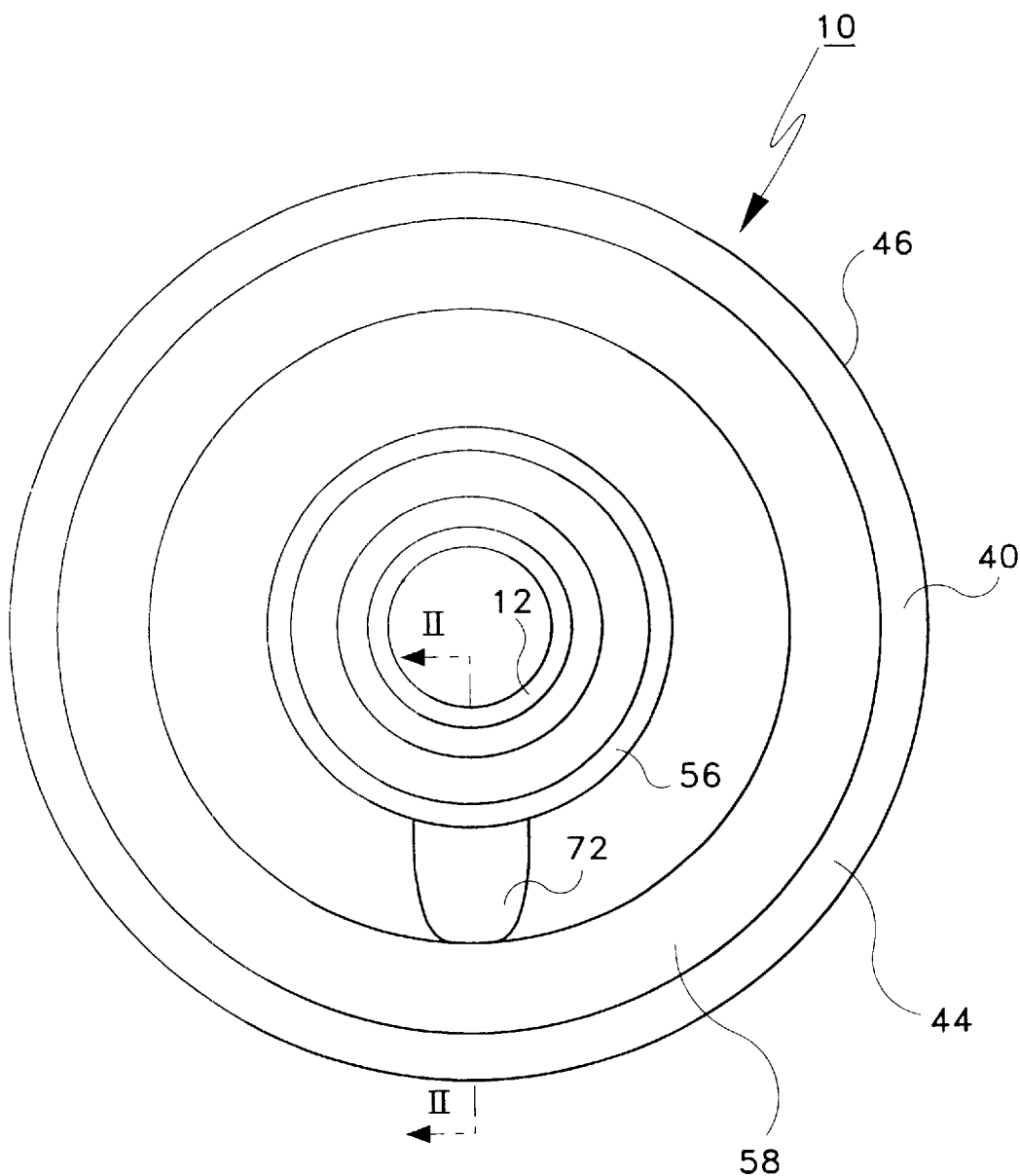
FIG. 1 is a front elevational view of a seal device constructed in accordance with a first embodiment of the invention.
Figure 2:
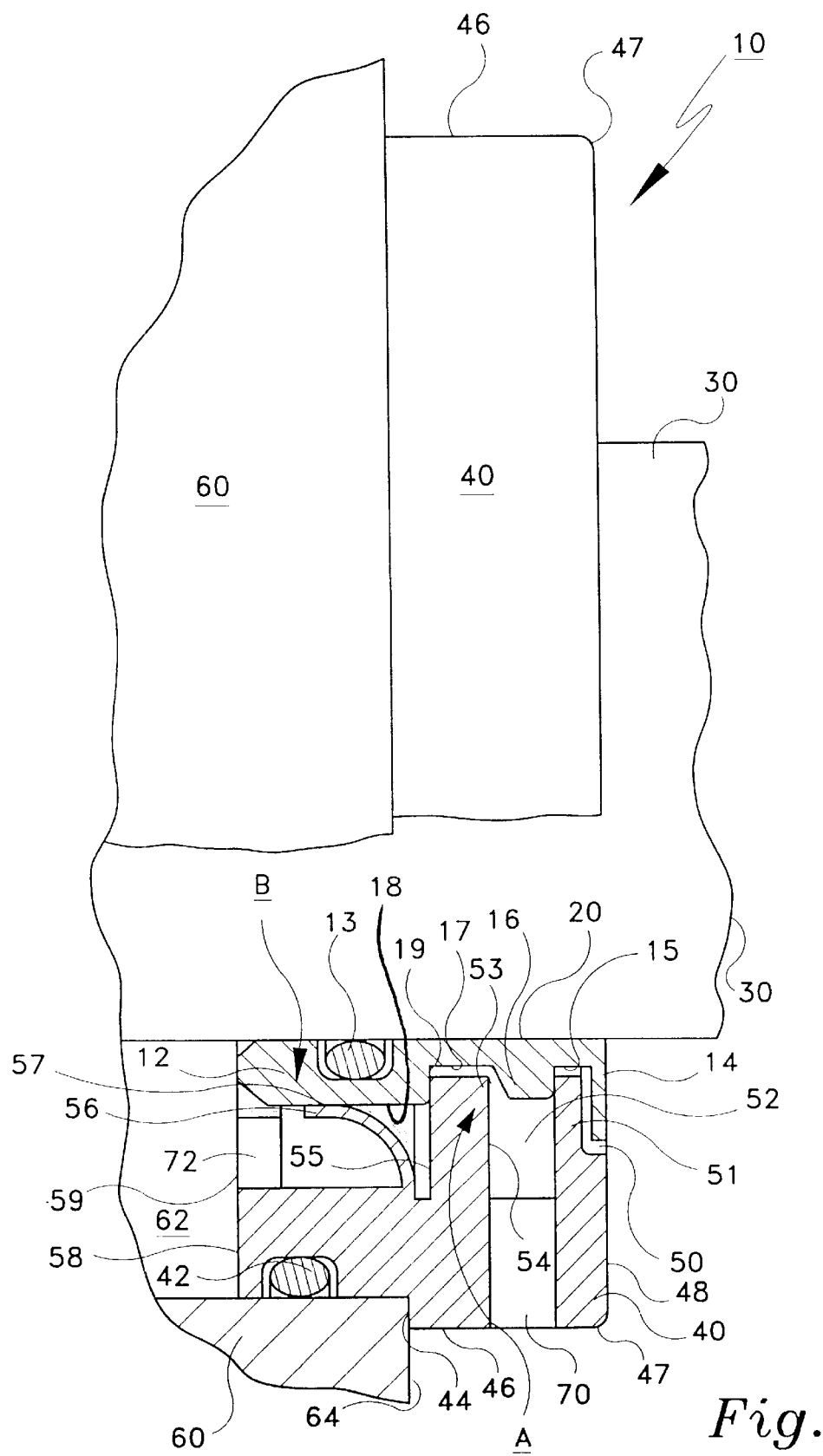
FIG. 2 is a partial cross sectional side view of the seal device of FIG. 1, taken along line II—II of FIG. 1, showing the seal device employed within a sealed system.

Referring now to FIGS. 1 and 2, a seal cartridge 10 is shown having a rotor 12 affixed to a rotatable shaft 30 via an O-ring 13. The seal 10 has a labyrinth portion and a contact portion. As discussed in more detail below, the labyrinth portion has an obstructed or mazelike passageway and provides dynamic and static sealing. The contact portion has a static component that is biased into a contact sealing relationship with the rotating shaft 30.

The rotor 12 includes a connecting flange 14, which is deformable, and an outwardly directed groove 15. In a preferred method of assembly, the flange 14 is machined into its finished shape prior to interlocking the rotor 12 with a stator 40. Alternatively, prior to assembly the flange 14 may be in an undeformed state extending in a direction parallel to the shaft 30, and is deformed after interlocking the rotor 12 with the stator 40. The rotor 12 further includes a shoulder 16, a second radially outwardly directed groove 17, a second shoulder 19 upon which is a radially outwardly directed surface 18, and an inwardly directed face 20.

In the illustrated embodiment, a stator 40 is interlocked with the rotor 12. The stator 40 is affixed to a stationary housing 60 by an O-ring 42. The stator 40 has an inwardly directed shoulder face 44 for locating the stator 40 with respect to the housing 60. The shoulder face 44 may be omitted in an alternative embodiment of the invention (described in more detail below). The stator 40 also has a ring-shaped cover 46 (FIG. 2) extending axially outwardly from the shoulder face 44. The cover 46 has a radial slot-shaped opening 70. The opening 70 is used to direct contaminants out of the seal cartridge 10.

The stator 40 further includes an annular notch 50 and an annular ridge 51, as well as an annular groove 52 and a second annular ridge 53. The second annular ridge 53 has an outwardly directed end face 54 and an oil-side facing surface 55. The stator 40 has a flange 56 resiliently bent downwardly toward the oil side 62 of the housing 60. The flange 56 has a contacting surface 57 which contacts the surface 18 of the rotor 12.

The stator 40 also has a radially extending ring 58. The ring 58 has an end face 59 facing the oil side 62 and includes an axially directed opening 72. The ring 58 acts to deflect oil pulses from bearings or internal gears. The opening 72 provides an opening into the seal 10 from the oil side 62 of the housing 60.

A labyrinth sealing portion A is formed by the flange 14, the shoulders 16, 19 and the outwardly directed grooves 15, 17, all of the rotor 12. In addition, the sealing portion A employs the notch 50, the annular ridges 51, 53, the annular groove 52 and the axially inwardly facing surface 55. When assembled, the elements of the sealing portion A do not contact each other. Instead, they create a labyrinthine pathway, i.e., an obstructed, mazelike, non-contact pathway between the rotor 12 and the stator 40 on the air side of the cartridge 10.

A contact sealing portion B includes the radially outwardly directed surface 18 of the rotor 12 and the flange 56, and its contact surface 57, of the stator 40. When assembled, the flange 56 is biased toward and contacts the rotor surface 18. Through such an arrangement, any oil splashing up from the oil side 62 of the housing 60 up through the opening 72 is prevented from migrating through and out of the seal 10.

The rotor 12 is interlocked with the stator 40, and then the seal 10 is affixed about the shaft 30 within the housing 60. The stator 40 may be assembled with the rotor 12 by any of a variety of methods, including thermally contracting or expanding one of the pieces, such as, for example, expanding the stator 40 to allow the annular ridge 51 to move axially from the oil side 62 of the housing 60 past the shoulder 16 of the rotor 12. Using heat to assemble the seal 10 has some disadvantages. For example, during expansion of the stator 40 it is heated to 700° F. When the stator cools it is intended to shrink back to its original size and should lock into the grooves 15, 17 of the rotor 12. However, when placing the rotor 12 within the stator 40, the annular ridges 51, 53 of the stator 40 may be deformed, thus inhibiting their ability to be properly positioned in the grooves 15, 17.

Other methods of assembly may be utilized, such as, for example, mechanically expanding the stator 40 by pushing it over the rotor 12 (described in detail below).

In operation, the rotor 12 rotates with the shaft 30. The flange 56 prevents oil from traveling from the oil side 62 of the housing 60 beyond the flange 56, due to contact between the flange 56 and the rotor surface 18. Since the contact is on the rotor 12, and not on the shaft 30, there should be no unacceptable damage to the shaft 30, and upon replacement of the seal cartridge 10, the shaft 30 should not have to be repaired.

Furthermore, since the stator flange 56 contacts the rotor 12, it is not necessary to specially finish a worn or damaged shaft 30 to obtain a sufficient seal, since the flange 56 will not encounter any defects or inconsistencies in the shaft 30. In addition, the combination of the axially directed opening 72, the flange 56 and the labyrinth portion A act to prevent leakage of oil from the seal 10. The flange 56, if properly biased toward and contacting the rotor 12, should properly seal against any leakage of oil from the oil side 62 of the housing 60. Nonetheless, the flange 56 may wear, allowing some leakage of oil from the oil side 62 to occur. In such a circumstance, the ring 58 acts as a secondary sealing system. Any oil which leaks into the seal is guided back to the oil side 62 through the opening 72. Further, the labyrinth portion A hinders and reduces any oil leakage past the flange 56. Finally, the axially directed opening 72 is optional, and is best used in applications of the seal 10 in which oil leakage is more critical.

Figure 3:
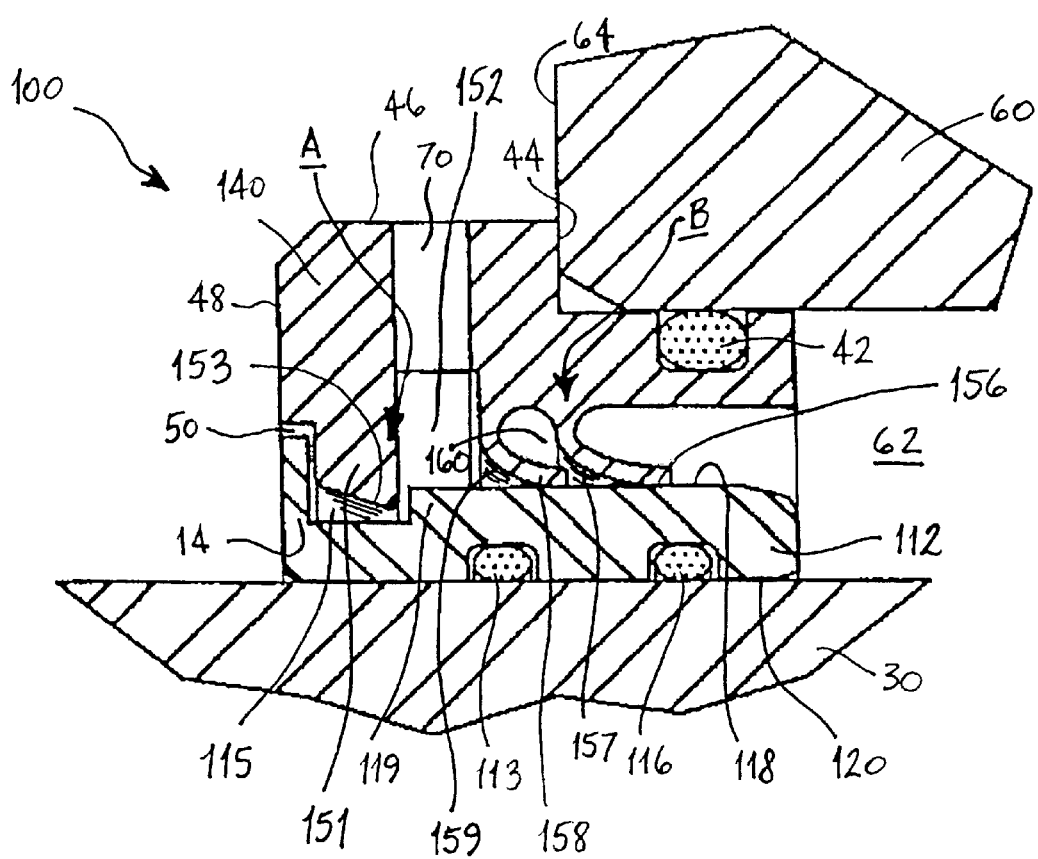
FIG. 3 is a cross sectional side view of a seal device constructed in accordance with a second embodiment of the invention.

An alternative labyrinth seal cartridge embodiment is described with reference to FIG. 3. The seal cartridge 100 includes a rotor 112 and a stator 140. The rotor 112 is affixed to the rotatable shaft 30 by way of a pair of elastomeric O-rings 113, 116. The rotor 112 includes the connecting flange 14, which is deformable, and an outwardly directed groove 115. In a preferred method of assembly, the flange 14 is machined into its finished shape prior to interlocking the rotor 112 with a stator 140. Alternatively, prior to assembly the flange 14 may be in an undeformed state extending in a direction parallel to the shaft 30, and is deformed after interlocking the rotor 112 with the stator 140. The rotor 112 further includes a shoulder 119 upon which is a radially outwardly directed surface 118, and an inwardly directed face 120.

In the illustrated embodiment, the stator 140 is interlocked with the rotor 112. The stator 140 is affixed to the stationary housing 60 by the O-ring 42. The stator 140 includes the inwardly directed shoulder face 44 for locating the stator 140 with respect to the housing 160. The stator 140 also includes the ring-shaped cover 46 extending axially outwardly from the shoulder face 44. The cover 46 has the radial slot-shaped opening 70. The opening 70 is used to direct contaminants out of the seal cartridge 100.

The stator 140 further includes the annular notch 50, an annular ridge 151, and an annular groove 152. The annular ridge 151 has a radially inwardly directed face 153 which is slanted to assist in the assembly of the stator 140 with the rotor 112. The stator 140 has a first flange 156 resiliently bent downwardly toward the oil side 62 of the housing 60. The flange 156 has a contacting surface 157 which contacts the surface 118 of the rotor 112. The stator 140 further includes a second flange 158 resiliently bent into contact with the surface 118 of the rotor 112. As shown, the second flange 158 is resiliently bent toward the oil side 62. The second flange 158 includes a contacting surface 159 which contacts the surface 118 of the rotor 112. The flanges 156, 158 are separated by a gap 160.

In operation, labyrinth sealing occurs at the labyrinth sealing portion A, which includes the annular notch 50, the outwardly directed groove 115, the annular ridge 151 and the shoulder 119. Contaminants may enter the seal cartridge 100 through the annular notch 50. Through relative rotation of the rotor 112 compared to the stator 140, and due to the annular ridge 151, any entering contaminants will change direction through the outwardly directed 115 and lose velocity and will eventually settle in the annular groove 152 and exit the cartridge 100 through the radial slot-shaped opening 70. The contact sealing portion B prevents the ingress or egress of liquid to and from the oil side 62. The pair of flanges 156, 158 assist in inhibiting water from entering the oil side 62 of the housing 60 and in inhibiting oil seepage from the oil side 62. In low lubricant or absent lubricant applications, grease can be applied to the stator 140 in the gap 160 between the flanges 156, 158 to keep the flanges lubricated and to provide a liquid-tight seal for inhibiting the migration of liquid either into or from the oil side 62.

Figure 4:
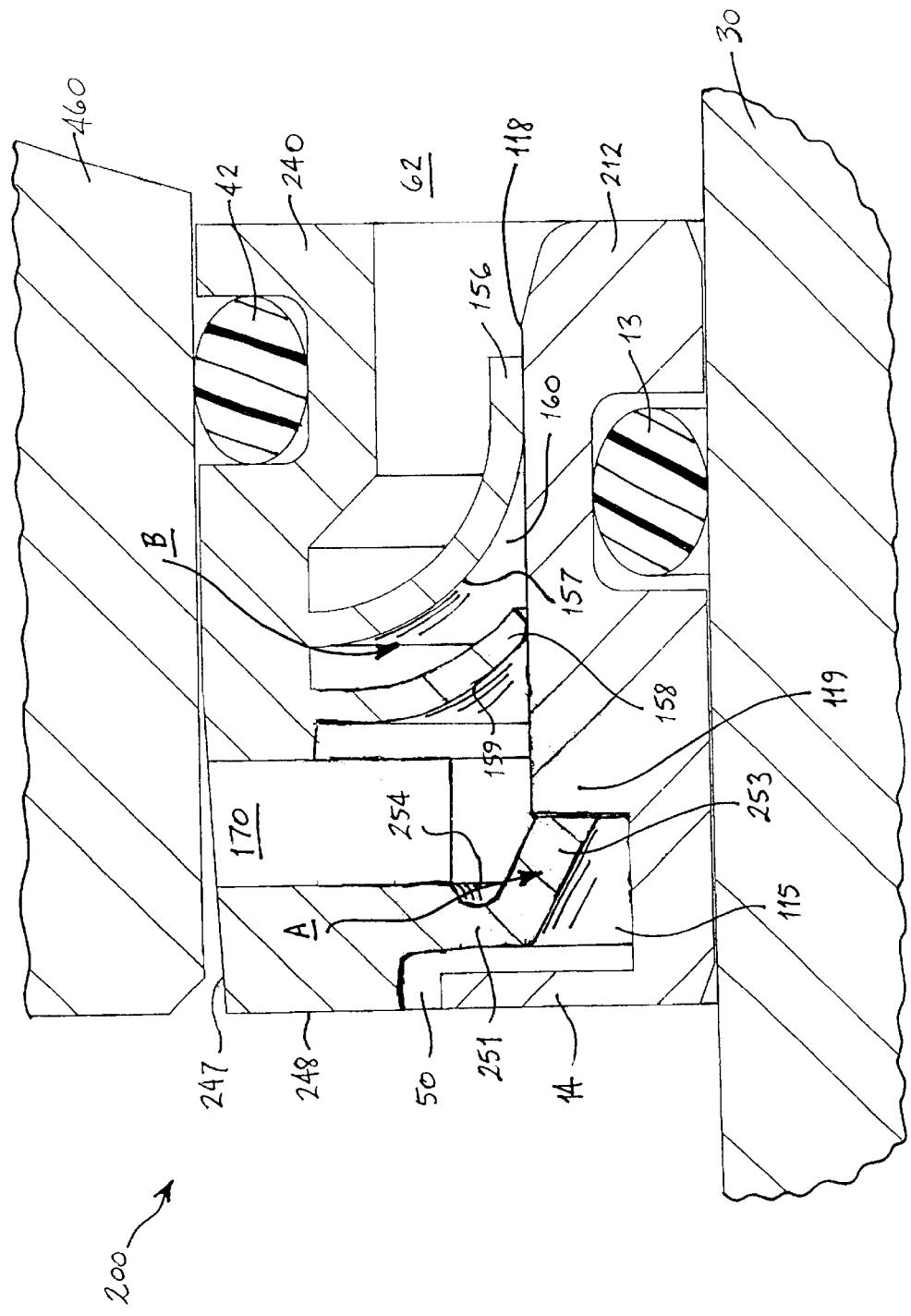
FIG. 4 is a cross sectional side view of a seal device constructed in accordance with a third embodiment of the invention.

FIG. 4 illustrates an alternative labyrinth seal cartridge 200. The seal cartridge 200 includes a rotor 212 and a stator 240. The rotor 212 is affixed to the rotatable shaft 30 by way of an elastomeric O-ring 13. The rotor 212 includes the connecting flange 14 and the outwardly directed groove 115. The rotor 212 includes the shoulder 119 upon which is the radially outwardly directed surface 118.

The stator 240, which is interlocked with the rotor 212, is affixed to a stationary housing 460 by the O-ring 42. The seal cartridge 200 is a deep-seating cartridge, meaning it can fit deeply within a housing and is not abutted to a housing shoulder. To assist in placement and removal of the seal cartridge 200, the stator 240 includes a slanted outer surface 247 which provides a gap between the cartridge 200 and the housing 460. The stator 240 includes a radial slotshaped opening 170 used to direct contaminants out of the seal cartridge 200.

The stator 240 further includes the annular notch 50 and an annular ridge 251. The annular ridge 251 includes a slanted leg 253 which is slanted to assist in the assembly of the stator 240 with the rotor 212. As shown, the leg 253 slants downwardly toward the shoulder 119 of the rotor 212. A cutout 254 is excised from the ridge 251 to assist in mechanical manipulation of the ridge 251 during assembly. As with the stator 140, the stator 240 has the first and second flanges 156, 158 resiliently bent downwardly toward the oil side 62 of the housing 460. The contacting surfaces 157, 159 of, respectively, the first and second flanges 156, 158 contact the surface 118 of the rotor 212. The flanges 156, 158 are separated by a gap 160.

Figure 5:
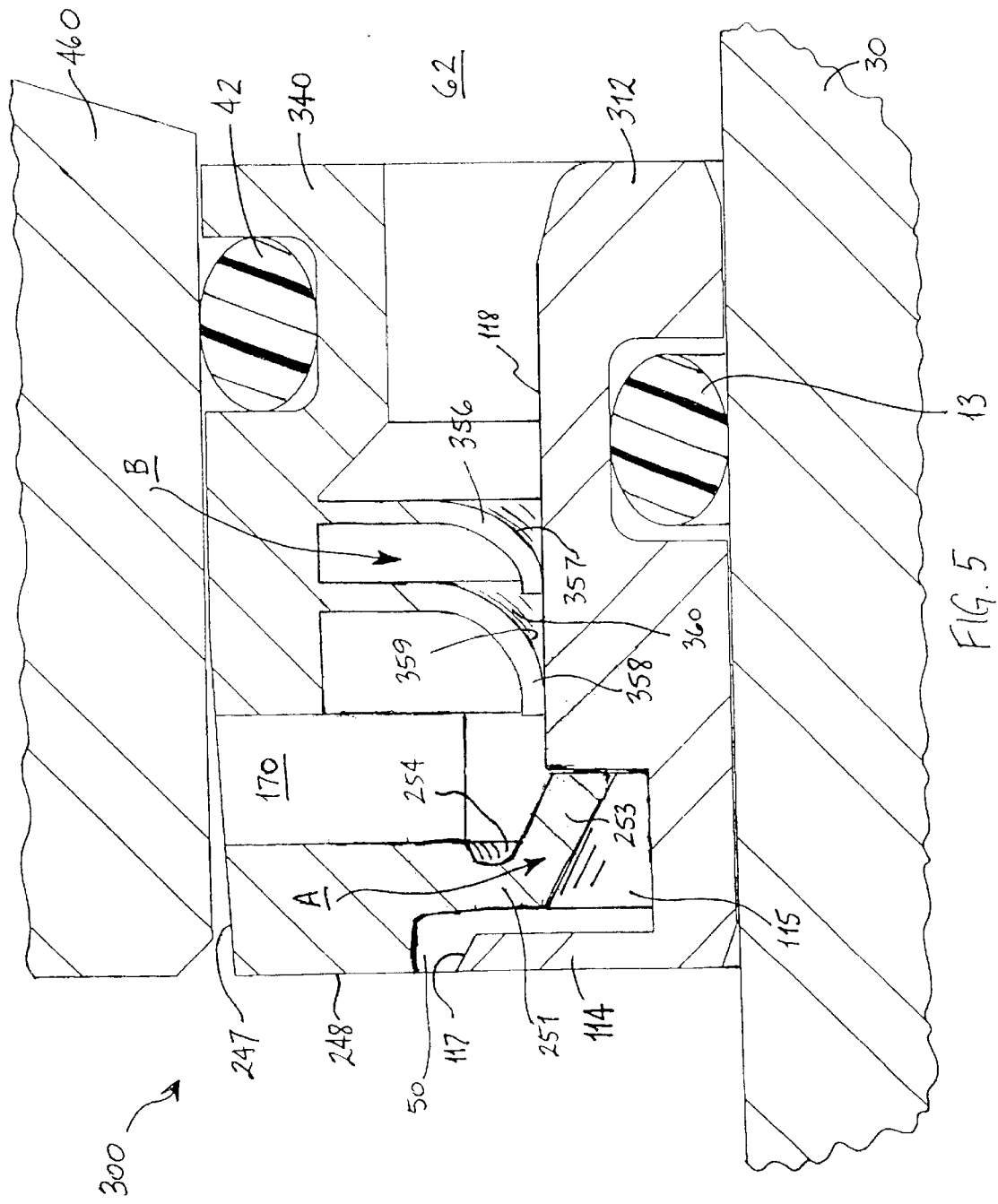
FIG. 5 is a cross sectional side view of a seal device constructed in accordance with a fourth embodiment of the present invention.
Figure 6:
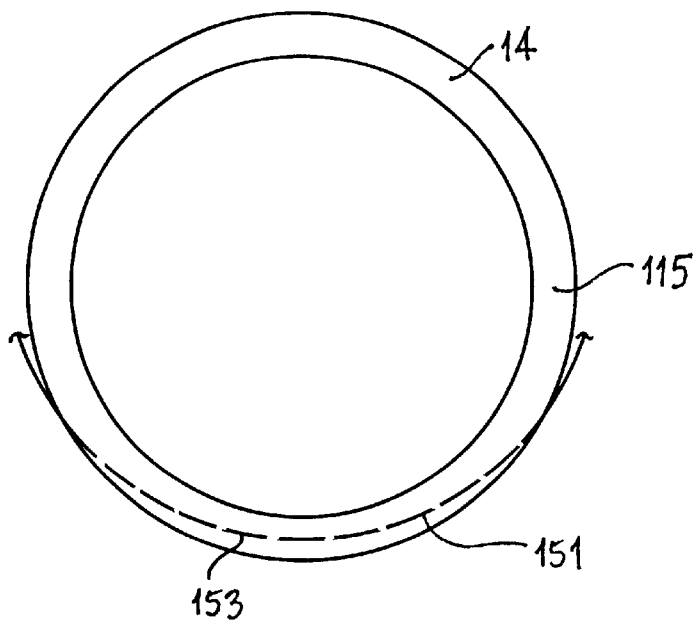
FIGS. 6–9 are schematic representations illustrating a method for assembling a seal device in accordance with a preferred embodiment of the invention.
Figure 7:
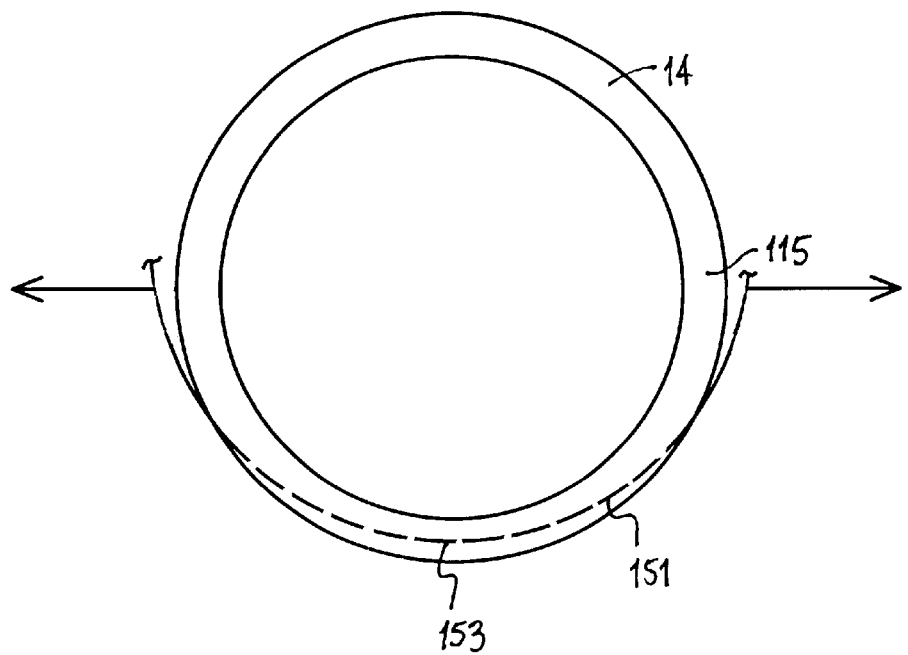
Figure 8:
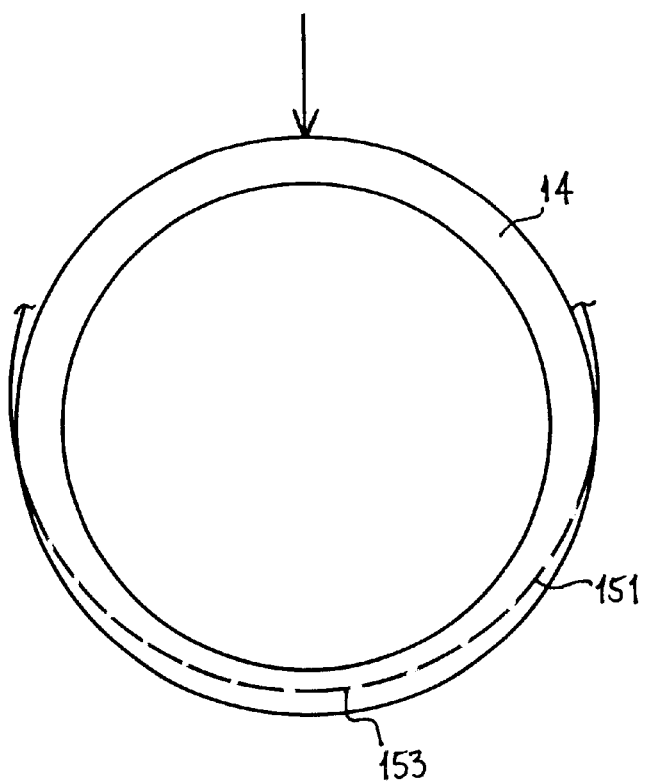
Figure 9:
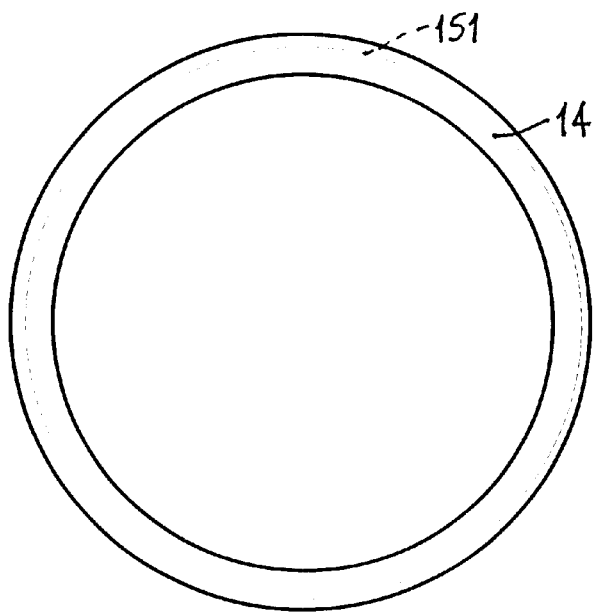

A seal cartridge 300 is shown in FIG. 5. The seal cartridge 300 is, like the seal cartridge 200, a deep-seating cartridge. The seal cartridge 300 includes a rotor 312 and a stator 340. The rotor 312 is similar to the rotor 212 with the exception of the flange 114. Unlike the flange 14, the flange 114 includes a slanted surface 117 to assist in mounting the stator 340 on the rotor 312.

The stator 340 includes the annular notch 50 and the annular ridge 251, including the slanted leg 253 and the cutout portion 254. Unlike the stator 240, the stator 340 has first and second flanges 356, 358 resiliently bent downwardly away from the oil side 62 of the housing 460. The first flange 356 has a contacting surface 357, and the second flange 358 has a contacting surface 359, both of which contact the surface 118 of the rotor 312. The flanges 356, 358 are separated by a gap 360.

The seal cartridges 100, 200, 300 may be assembled either through the use of heat (described above) or through mechanical manipulation. The stator 140, 240, 340 may be snap-fit or force fit onto the rotor 112, 212, 312 by pushing the annular ridge 151, 251 past the flange 14, 114 and into the outwardly directed groove 115.

Alternatively, and with reference with FIGS. 6–9, the annular ridge 151, 251 may be positioned within the groove 115 through a combination of rocking and pulling the stator around the rotor. A portion of the periphery of the radially inwardly directed face 153 is fit under the flange 14 and within the radially outwardly directed groove 115. Only a portion of the periphery of the face 153 can be fit within the groove 115 in this way, because the diameter of the rotor is not small enough relative to the diameter of the stator to allow the entire periphery of the face 153 to fit within the groove 115. To increase the amount of the periphery of the face 153 fitting within the groove 115, the stator is flexed outwardly. After fitting the increased amount of the periphery of the face 153 within the groove 115, movement of the ridge 151 within the groove 115 combined with radially inwardly directed pressure on the flange 14 will allow for the remainder of the ridge 151 to fit within the groove 115. Throughout this assembly process, the face 153, 253 assists in sliding the ridge 151, 251 past the flange 14, 114. Further, the face 117 of the flange 114 also provides assistance in the assembly process.

The above description and drawings are only illustrative of certain preferred versions which achieve the objects, features and advantages of the present invention. It is not intended that the present invention be limited to these versions. For example, although two-piece seals are illustrated and described, the present invention is not to be so limited and can include seals with a different number of pieces. Further, although the seals illustrated and described include pieces which interlock one with the other, the present invention may include seals having separate pieces which do not interlock. In addition, while the pair of flanges are shown to resiliently bend in the same direction, it is to be understood that one flange may bend in one direction and the other flange may bend in the opposite direction. Also, although the annular ridge 251 is shown with the leg 253 slanted downwardly toward the oil side 62, it is to be understood that the leg may be slanted downwardly going away from the oil side 62. Finally, although two flanges are shown and described, one or more than two flanges may be included. Accordingly, the invention is not to be seen as limited by the foregoing description, but is only limited by the scope of the appended claims.

What is claimed as new and desired to be protected by a Letters Patent of the United States:

1. A two-piece, interlocked seal device adapted to be mounted upon a rotatable shaft, said seal device comprising:
    a rotor having a flange, a radially outwardly directed groove, and a radially outwardly directed surface; and
    a stator having a cover with an annular notch and a radial opening adapted to direct contaminants from the seal, a radially inwardly directed ridge, and at least one flange biased toward said rotor surface;
        wherein said stator ridge is positioned within said rotor groove and said rotor flange is positioned within said stator annular notch to create a labyrinth portion and said stator flange and said rotor surface create a contact portion.

2. The seal device of claim 1, comprising a plurality of stator flanges biased toward said rotor surface.

3. The seal device of claim 2, wherein two stator flanges are biased toward said rotor surface.

4. The seal device of claim 3, further including grease positioned between said two stator flanges.

5. The seal device of claim 1, wherein said stator flange is axially directed away from said stator ridge.

6. The seal device of claim 1, wherein said stator flange is axially directed toward said stator ridge.

7. The seal device of claim 1, wherein said stator ridge includes an inclined surface.

8. The seal device of claim 1, wherein said stator ridge includes an inclined leg.

9. The seal device of claim 8, wherein said stator ridge is adapted to flex under pressure.

10. The seal device of claim 9, wherein said stator ridge includes a cutout portion.

11. The seal device of claim 1, wherein said stator includes a surface adapted for abutting against a housing.

12. The seal device of claim 1, wherein said stator includes an inclined outer surface.

13. A two-piece, interlocked seal device adapted to be mounted upon a rotatable shaft, said seal device comprising:
    a rotor having a flange, a radially outwardly directed groove, and a radially outwardly directed surface; and
    a stator having a cover with an annular notch and a radial opening adapted to direct contaminants from the seal, a radially inwardly directed ridge including an inclined surface, and a plurality of flanges biased toward said rotor surface;
        wherein said stator ridge is positioned within said rotor groove and said rotor flange is positioned within said stator annular notch to create a labyrinth portion and said stator flanges and said rotor surface create a contact portion.

14. The seal device of claim 13, wherein two stator flanges are biased toward said rotor surface.

15. The seal device of claim 14, further including grease positioned between said two stator flanges.

16. The seal device of claim 13, wherein said stator flanges are axially directed away from said stator ridge.

17. The seal device of claim 13, wherein said stator flanges are axially directed toward said stator ridge.

18. The seal device of claim 13, wherein said stator ridge inclined surface is on an inclined leg.

19. The seal device of claim 18, wherein said stator ridge is adapted to flex under pressure.

20. The seal device of claim 19, wherein said stator ridge includes a cutout portion.

21. The seal device of claim 13, wherein said stator includes a surface adapted for abutting against a housing.

22. The seal device of claim 13, wherein said stator includes an inclined outer surface.

23. A sealed system including a housing, a rotatable shaft and a two-piece seal device, said seal device comprising:
    a rotor having a flange, a radially outwardly directed groove, and a radially outwardly directed surface; and
    a stator having a cover with an annular notch and a radial opening adapted to direct contaminants from the seal, a radially inwardly directed ridge, and at least one flange biased toward said rotor surface;
        wherein said stator ridge is positioned within said rotor groove and said rotor flange is positioned within said stator annular notch to create a labyrinth portion and said stator flange and said rotor surface create a contact portion.

24. The sealed system of claim 23, comprising a plurality of stator flanges biased toward said rotor surface.

25. The sealed system of claim 24, wherein two stator flanges are biased toward said rotor surface.

26. The sealed system of claim 25, further including grease positioned between said two stator flanges.

27. The sealed system of claim 23, wherein said stator flange is axially directed away from said stator ridge.

28. The sealed system of claim 23, wherein said stator flange is axially directed toward said stator ridge.

29. The sealed system of claim 23, wherein said stator ridge includes an inclined surface.

30. The sealed system of claim 23, wherein said stator ridge includes an inclined leg.

31. The sealed system of claim 30, wherein said stator ridge is adapted to flex under pressure.

32. The sealed system of claim 31, wherein said stator ridge includes a cutout portion.

33. The sealed system of claim 23, wherein said stator includes a surface adapted for abutting against a housing.

34. The sealed system of claim 23, wherein said stator includes an inclined outer surface.

35. A sealed system including a housing, a rotatable shaft and a two-piece seal device, said seal device comprising:
    a rotor having a flange, a radially outwardly directed groove, and a radially outwardly directed surface; and a stator having a cover with an annular notch and a radial opening adapted to direct contaminants from the seal, a radially inwardly directed ridge including an inclined surface, and a plurality of flanges biased toward said rotor surface;
   wherein said stator ridge is positioned within said rotor groove and said rotor flange is positioned within said stator annular notch to create a labyrinth portion and said stator flanges and said rotor surface create a contact portion.

36. The sealed system of claim 35, wherein two stator flanges are biased toward said rotor surface.

37. The sealed system of claim 36, further including grease positioned between said two stator flanges.

38. The sealed system of claim 37, wherein said stator flanges are axially directed away from said stator ridge.

39. The sealed system of claim 35, wherein said stator flanges are axially directed toward said stator ridge.

40. The sealed system of claim 35, wherein said stator ridge inclined surface is on an inclined leg.

41. The sealed system of claim 40, wherein said stator ridge is adapted to flex under pressure.

42. The sealed system of claim 41, wherein said stator ridge includes a cutout portion.

43. The sealed system of claim 35, wherein said stator includes a surface adapted for abutting against a housing.

44. The sealed system of claim 35, wherein said stator includes an inclined outer surface.

* * * * *